United States Patent [19]
Iguchi et al.

[11] Patent Number: 5,587,529
[45] Date of Patent: Dec. 24, 1996

[54] ANGULAR RATE DETECTOR

[75] Inventors: Yutaka Iguchi, Chita-gun; Kazuo Sato, Toyota; Toshihiro Kobayashi; Masayuki Sato, both of Nagoya, all of Japan

[73] Assignee: Aisin Seiki Kabushiki Kaisha, Kariya, Japan

[21] Appl. No.: 461,743

[22] Filed: Jun. 5, 1995

[30] Foreign Application Priority Data

Jun. 3, 1994 [JP] Japan ................................. 6-122229
Jun. 14, 1994 [JP] Japan ................................. 6-132048
Sep. 28, 1994 [JP] Japan ................................. 6-232674

[51] Int. Cl.$^6$ ................................................. G01P 9/04
[52] U.S. Cl. ................................................. 73/504.13
[58] Field of Search ....................... 73/504.12, 504.13, 73/504.14, 504.15, 504.16

[56] References Cited

U.S. PATENT DOCUMENTS 5,197,331  3/1993  Oikawa ............................. 73/504.12

FOREIGN PATENT DOCUMENTS 3130611  6/1991  Japan .
5240649  9/1993  Japan .
5288555  11/1993  Japan .
2154739  9/1985  United Kingdom .
2266149  10/1993  United Kingdom .

Primary Examiner—John E. Chapman
Attorney, Agent, or Firm—Sughrue, Mion, Zinn, Macpeak & Seas

[57] ABSTRACT

An angular rate detector includes an oscillator having a first terminal to which a drive voltage is applied, a second terminal where a signal occurs having a given phase displacement with respect to a signal appearing at the first terminal during a resonance of the oscillator and a third terminal where a signal occurs having a phase which changes in accordance with an angular rate. An oscillator is provided for producing an alternating signal which corresponds to the drive voltage applied to the first terminal in accordance with the signal appearing at the second terminal. A frequency multiplier responsive to a signal which corresponds to the oscillation frequency of the oscillator produces a clock pulse having a frequency higher than the oscillation frequency. A phase difference pulse signal is produced having a duty cycle which changes in accordance with a phase difference between the signal occurring at the third terminal of the oscillator and either the signal applied to the first terminal or the signal occurring at the second terminal. A counter is provided for counting the clock pulses during a time interval when the phase difference pulse signal assumes either a high or a low level.

7 Claims, 8 Drawing Sheets

ANGULAR RATE DETECTOR

FIELD OF THE INVENTION

The invention relates to an angular rate detector which uses an oscillator.

BACKGROUND OF THE INVENTION

The art relating to devices which detect an angular rate of rotation utilizing an oscillator is disclosed, for example, in Japanese Laid-Open Patent Applications No. 240,649/1993 and No. 288,555/1993 and British Patent Publication No. GB 2,266,149A.

In a device which detects an angular rate of rotation as cited above, an oscillator such as piezoelectric element is driven at its point of resonance for oscillation at a frequency which coincides with the natural frequency thereof, and a phase difference between a signal appearing at a drive terminal and a signal appearing at a detecting terminal of the oscillator is measured to detect an angular rate. However, the natural frequency of an oscillator varies under the influences of ambient temperatures or the like. Accordingly, when driving the oscillator at a given frequency in an environment which undergoes a temperature change, it is impossible to maintain the operation of the oscillator at its resonance. A deviation of the operation of the oscillator from the resonance causes a fluctuation in the amplitude of the oscillation, causing an error in the relationship between the phase difference and the angular rate.

To accommodate for this, in the cited British Patent Publication No. GB 2,266,149A, PLL (phase locked loop) circuit is employed in an attempt to maintain the operation of the oscillator at its resonance. Specifically, the frequency of the oscillation of VCO (voltage controlled oscillator) is automatically adjusted so that a signal applied to a drive terminal of the oscillator has a phase difference of 90° with respect to a signal occurring at a terminal of the oscillator from which a feedback voltage is derived.

In Japanese Laid-Open Patent Application No. 240,649/1993, a pulse signal having a duty cycle which varies in accordance with a phase difference, indicative of an angular rate, is applied to an exclusive OR circuit, which passes it for smoothing and amplifying it, thus producing an analog voltage which represents the angular rate.

In Japanese Laid-Open Patent Application No. 288,555/1993, a difference in the amplitudes of signals from a pair of oscillators is amplified in a differential amplifier, the output of which is detected by a synchronous detector and smoothed, thus producing an analog voltage representing the angular rate.

In the conventional angular rate detectors, an analog circuit is adopted over the entire circuit or in major portion thereof when processing a signal or signals, and this is likely to cause an error of detection due to variations of responses from elements to elements used in the circuit or due to temperature changes.

In the device disclosed in Japanese Laid-Open Patent Application No. 240,649/1993, it is possible to employ a digital processing of a pulse signal produced by the device. By way of example, the pulse width of the signal may be counted by a counter, thus deriving information which is indicative of the angular rate. However, because the frequency of resonance of the oscillator changes with a change in the temperature, the oscillation frequency of the oscillator must be changed accordingly. A change in the oscillation frequency of the oscillator results in a change in the period of the pulse signal to be measured. This means that if the pulse signal maintains a constant duty cycle, the resulting pulse width changes. Since the angular rate corresponds to the duty cycle of the signal, it follows that a change in the oscillation frequency of the oscillator results in an error being produced in the angular rate being determined. To eliminate such an error, there must be provided a circuit which determines the period of oscillation of the oscillator, and another circuit which calculates a ratio of the period of oscillation to the pulse width, inevitably resulting in a complex arrangement. In particular, the determination of a time interval must be carried out in a rapid manner in order to increase the resolution in detecting the angular rate. However, such processing operation cannot be realized with a software in a microcomputer, presenting a need for a complex hardware arrangement.

SUMMARY OF THE INVENTION

It is a task of the invention to reduce an error in detecting an angular rate and to simplify the arrangement of a device required.

The above task is solved by providing an angular rate detector according to the invention which uses an oscillator (2) including a first terminal (5a, 5b) to which a drive voltage is applied, a second terminal (4a, 4b) where a signal appears having a given phase displacement with respect to the signal applied to the first terminal during the resonance of the oscillator, and a third terminal (6a, 6b) where a signal occurs having a phase which changes in accordance with the angular rate, oscillation means include either one of means (23) for producing an alternating signal corresponding to the resonance frequency of the oscillator and applying it to the first terminal and means (40C, 50) for forming a positive feedback loop connected between the second and the first terminal of the oscillator and including the oscillator. A frequency multiplier means (18) is used for producing a clock pulse (SN, SI) of a frequency higher than the oscillation frequency on the basis of a signal corresponding to the oscillation frequency of the oscillator. Means (51) produces a phase difference pulse signal (SH) having a duty cycle which changes in accordance with a phase difference between the signal occurring at the third terminal of the oscillator and either one of the signal applied to the first terminal or the signal appearing at the second terminal. Counter means (52, 53) count the clock pulse which occurs during either a high level or a low level interval of the phase difference pulse signal produced by the phase difference pulse producing means.

According to another feature of the invention, the frequency multiplier means comprises a first frequency divider (18) arranged in a loop which controls the frequency of the oscillator means, a second frequency divider (56) having a frequency dividing ratio or factor which is different from that of the first frequency divider for frequency dividing a signal which appears at the input to the first frequency divider, and a frequency multiplier circuit (30) for frequency multiplying a signal which is output from the second frequency divider. In addition, means (55) is provided which produces a signal (SJ) which controls the time interval during which the counting operation by the counter means occurs to be equal to or greater than a plurality of periods, as defined by the oscillation frequency of the oscillator.

According to another aspect of the invention, the frequency multiplier means includes a frequency divider (56) and a frequency multiplier circuit (30C) connected in series to each other, with the product of the dividing factor of the frequency divider and the multiplying factor of the frequency multiplier being chosen to be other than an integral number, and a signal which is output from the frequency divider determines a time interval during which the counting operation by the counter means occurs such that it is equal to a plurality of periods, as defined by the oscillation frequency of the oscillator.

It is to be noted that numerals and characters appearing in parentheses in the above description correspond to reference numerals and characters used to designate corresponding elements or parts appearing in embodiments to be described later, but that the elements or components which are used to construct the invention are not limited to the specific elements or components exemplified in the embodiments.

According to the invention, a phase difference pulse signal (SH) produced by means (51) has a duty cycle which varies in accordance with an angular rate of rotation which an oscillator undergoes. Representing the pulse width of the phase difference pulse signal (SH) by $\Delta T$ and its period by T, $\Delta T/T$ represents an angular rate of rotation which is to be detected. A clock pulse (SN, SI) which is produced by the frequency multiplier means (18) is formed by frequency multiplying a signal which corresponds to the oscillation frequency of the oscillator, and accordingly has a higher frequency than the oscillation frequency of the oscillator. Counter means (52, 53) counts the clock pulse during a time interval when the phase difference pulse signal assumes either a high level or a low level. The number of pulses counted by the counter means corresponds to the pulse width $\Delta T$. Since the clock pulse which is counted is formed by frequency multiplying a signal corresponding to the oscillation frequency of the oscillator, the clock pulse has a time period which has a proportional relationship with the period of oscillation T. Accordingly, should the period of oscillation T change as a result of a temperature fluctuation, the number of pulses which are counted by the counter means cannot change. Thus, the count in the counter means is proportional to $\Delta T/T$ or the angular rate of rotation.

The oscillation means used to drive the oscillator may comprise an independent oscillator (23) which is arranged in a circuit element such as PLL circuit, for example, or may comprise a self-excited oscillator (40C, 50) forming a positive feedback loop together with the oscillator.

It is an advantage of the invention that an error which results from a variation in the period of oscillation of the oscillator can be prevented from occurring, without requiring a circuit which determines the period of oscillation of the oscillator or a circuit which calculates a ratio of such period of oscillation to the pulse width, thus simplifying the arrangement. The arrangement will be further simplified if the self-excited oscillator (40C, 50) is employed as the oscillation means.

In another aspect of the invention, the frequency multiplier means comprises a first frequency divider (18) arranged in a loop which controls the frequency of the oscillation means, a second frequency divider (56) having a dividing factor which is different from that of the first frequency divider for dividing the signal appearing at the input to the first frequency divider, and a frequency multiplier circuit (30) for multiplying a signal which is output from the second frequency divider. In this manner, the clock pulse which is obtained at the output of the frequency multiplier circuit has a frequency, which can be advantageously offset from an integral multiple of the oscillation frequency of the oscillator.

By way of example, assuming that the first frequency divider has a divider factor of 1/32, the second frequency divider has a dividing factor of 1/31 and the frequency multiplier circuit has a multiplying factor of 1024, it follows that assuming the oscillator has an oscillation frequency of f, the resulting frequency of the clock pulse will be equal to (1024×32/31) f, whereby the frequency ratio is offset from an integral multiple. In this manner, the number of clock pulses which are counted in one period during which the phase difference pulse signal assumes either a high level or a low level includes a fraction. A fraction cannot be counted in actuality, and accordingly there occurs either rounding off or up. According to this feature of the invention, the signal (SJ) produced by means (55) which establishes a counting interval causes the counter means to accumulate the number of pulses which appear over a plurality of periods during which the phase difference pulse signal assumes either a high level or a low level. In this instance, since the clock pulse assumes a different phase from period to period, a fragment which occurs in a count will be subject to a rounding off in a certain period while it will be subject to a rounding up in a different period, thus producing a smoothing effect between errors which occur by rounding off and up to reduce the resulting error.

The resolution in detecting the angular rate will be improved by counting a fragment which occurs in the number of clock pulses counted. If the clock pulse had a frequency which is an integral multiple of the oscillation frequency of the oscillator, there occurs no fragment, and accordingly, the resolution cannot be improved if the counting operation is extended over a plurality of periods. On the contrary, if the frequency of the clock pulse is increased in order to increase the resolution, the counter must be constructed by a high speed circuit, resulting in an increased cost. However, according to the refinement mentioned above, a clock pulse of a relatively low frequency can be used, thus resulting in an inexpensive arrangement.

According to a further feature of the invention, the frequency multiplier means comprises a frequency divider (56) and a frequency multiplier circuit (30C) which are connected in series to each other, and the dividing factor of the frequency divider and the multiplying factor of the frequency multiplier circuit are chosen so that their product is offset from an integral number. In this manner, the frequency of the clock pulse which is obtained at the output of the frequency multiplier circuit can be made offset from an integral multiple of the oscillation frequency of the oscillator. Since the time interval over which the counting operation by the counter means occurs is controlled by the signal which is output from the frequency divider, to be a plurality of periods, as defined by the oscillation frequency of the oscillator, the resolution can be improved as before in detecting the angular rate.

Other objects and features of the invention will become apparent from the following description of embodiments described with reference to the drawings.

DETAILED DESCRIPTION OF PREFERRED EMBODIMENTS

Figure 1:
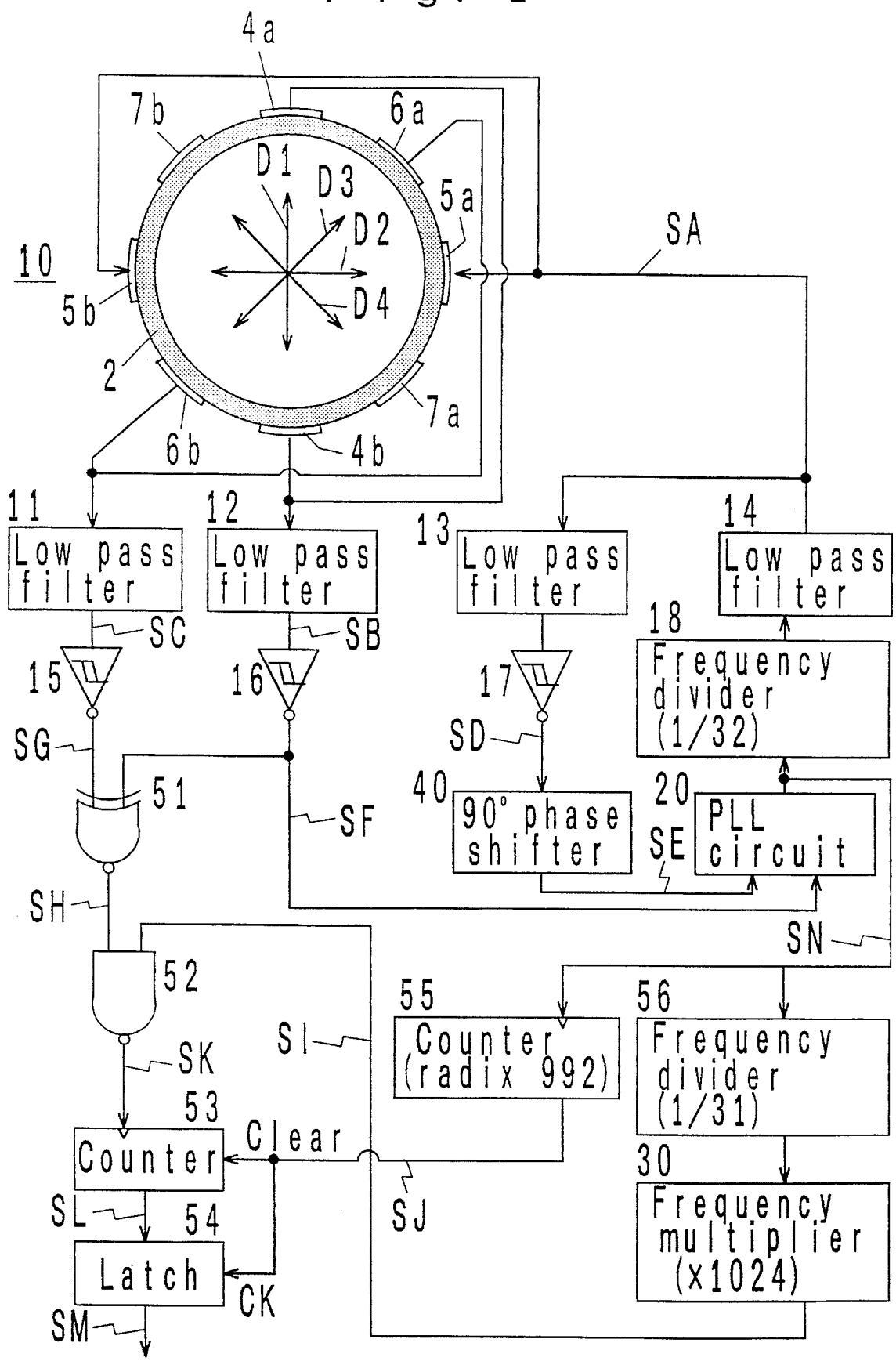
FIG. 1 is a block diagram of an angular rate detector according to one embodiment of the invention.

FIG. 1 shows an angular rate detector according to one embodiment of the invention. Certain parts shown in FIG. 1 are shown in detail in FIG. 2, and the appearance of a sensor element 10 shown in FIG. 1 is illustrated in FIG. 3. Referring to FIG. 1, a sensor element 10 is shown as taken along a section line 1A—1A shown in FIG. 3.

The sensor element 10 includes a cylindrical piezoelectric body 2, which is secured at its bottom to an element base 1 having a disc-shaped top and a limb or a shank in the form of a round rod which extends from the bottom surface of the disc.

Over substantially its upper half, the outer peripheral surface of the cylindrical piezoelectric body 2 is covered by a reference potential electrode 3 which is connected to the electrical ground of the device while over the lower half, eight electrode segments, having an identical configuration, are cemented to the outer peripheral surface of the body 2 at an angular pitch of 45°. As viewed in FIG. 1, a pair of electrode segments 4a, 4b, representing feedback electrodes, are disposed opposite to each other along a first diametrical direction D1, another pair of electrode segments 5a, 5b, representing exciting electrodes, are disposed opposite to each other along a second diametrical direction D2, a further pair of electrode segments 6a, 6b, representing detecting electrodes, are disposed opposite to each other along a third diametrical direction D3. In the present example, an additional pair of electrode segments 7a, 7b, which are disposed opposite to each other along a fourth diametrical direction D4, are not used.

An alternating voltage generated by an oscillation circuit is applied across the exciting electrodes 5a, 5b of the sensor element 10, whereby the cylindrical piezoelectric body 2 is excited into deformation and oscillation. A resulting oscillation of the piezoelectric body 2 induces a signal at the feedback electrodes 4a, 4b, which is fed back to the oscillation circuit. By utilizing the feedback signal, the oscillation circuit automatically adjusts the frequency of its output signal so that the piezoelectric body 2 can be oscillated at a frequency which coincides with its natural frequency fm.

When a power supply to the oscillation circuit is turned on, a voltage is applied between the exciting electrodes 5a, 5b and the reference potential electrode 3, whereby the cylindrical piezoelectric body 2 expands or shrinks in the second diametrical direction D2. Such deformation induces a voltage beteween the feedback electrodes 4a, 4b and the reference potential electrode 3. The configuration of the cylindrical piezoelectric body 2 during the oscillation which comprises an expansion/shrinkage cycle is illustrated at its peak of shrinkage by dotted lines 2B and at its peak of expansion by phantom lines 2A in an exaggerated manner in FIG. 4. It will be seen from FIG. 4 that the expansion/shrinkage in the second diametrical direction D2 corresponds to the shrinkage/expansion in the first diametrical direction D1, and thus the peak of shrinkage in the direction D2 corresponds to the peak of expansion in the direction D1. Accordingly, in the present example, the cylindrical piezoelectric body 2 experiences an oscillation which occurs in cruciform directions (D1 and D2).

It will be noted that when the cylindrical piezoelectric body 2 experiences oscillations in cruciform directions D1 and D2 (see phamtom lines 2A and dotted lines 2B shown in FIG. 4), the detecting electrodes 6a, 6b are situated at the nodes of oscillation, and hence, a voltage which would appear across these detecting electrodes and the reference potential electrode 3 will be minimal. Ideally, no voltage would appear, but since the configuration of the cylindrical piezoelectric body 2 is not perfectly cylindrical, a voltage of a certain magnitude will be developed.

Figure 4:
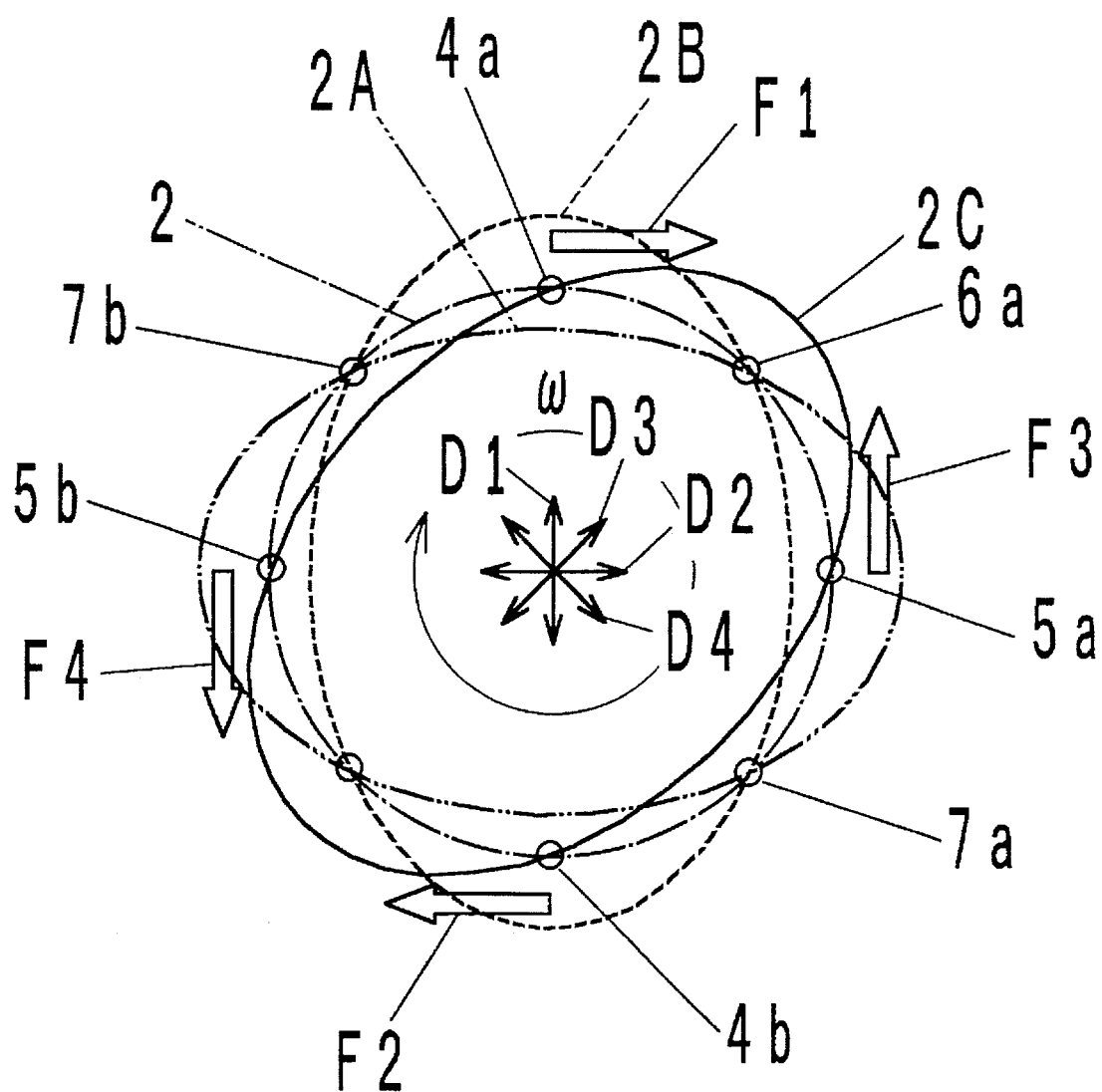
FIG. 4 is a plan view illustrating a manner of oscillation of a cylindrical piezoelectric body 2.

When the cylindrical piezoelectric body 2 rotates, for example, when it rotates clockwise, as illustrated in FIG. 4, the combination of such rotation and the oscillation of the piezoelectric body 2 produces Coriolis forces F1 to F4, which cause the oscillation of the piezoelectric body 2 to be twisted from the direction D2 to either third diametrical direction D3, as shown in solid line 2C in FIG. 4, or fourth diametrical direction D4, increasing the voltage which is developed at the detecting electrodes 6a, 6b while simultaneously causing a phase shift of such voltage. The amount of such phase shift corresponds to the angular rate of rotation to which the cylindrical piezoelectric body 2 is subject. Thus, it will be seen that the arrangement shown in FIG. 1 is provided with a circuit which determines the amount of phase shift occurring in a signal appearing at the detecting electrodes 6a, 6b.

Returning to FIG. 1, the oscillation circuit which is used to excite the cylindrical piezoelectric body 2 will be described. A PLL (phase locked loop) circuit 20 includes a pair of input terminals, to which signals SE and SF are applied. The PLL circuit 20 delivers a signal (a sinusoidal wave) which is fed through a frequency divider 18 and a low pass filter 14 to be applied to the exciting electrodes 5a, 5b as a drive signal SA. The drive signal SA is also input through a low pass filter 13 to an inverter 17 with a Schmidt trigger. A binary signal SD which is obtained at the output of the inverter 17 is fed through a 90° phase shifter 40 to be converted into the signal SE, which is phase lagging by 90° with respect to the signal SD. A signal occurring at the feedback electrodes 4a, 4b is passed through a low pass filter 12 for input to an inverter 16 with a Schmidt trigger. A binary signal SF which is obtained at the output of the inverter 10 is applied to one of the input terminals of the PLL circuit 20.

The low pass filters 12 and 14 function to eliminate harmonic components contained in the input signal and to extract only a component corresponding to the fundamental wave (or a sinusoidal wave of a frequency which coincides with the natural frequency of the piezoelectric body 2). The purpose of the low pass filter 13 is compensate for the influence of a phase displacement which occurs in the low pass filter 12. It is to be noted that the low pass filters 12, 13 and 14 have a cut-off frequency which is slightly higher than the natural frequency or resonance frequency of the piezoelectric body 2. The resonance frequency of the piezoelectric body 2 undergoes a small change with a temperature change or the like, but is not subject to any significant change, and accordingly, the cut-off frequency of the low pass filters 12, 13 and 14 is fixed.

Figure 2:
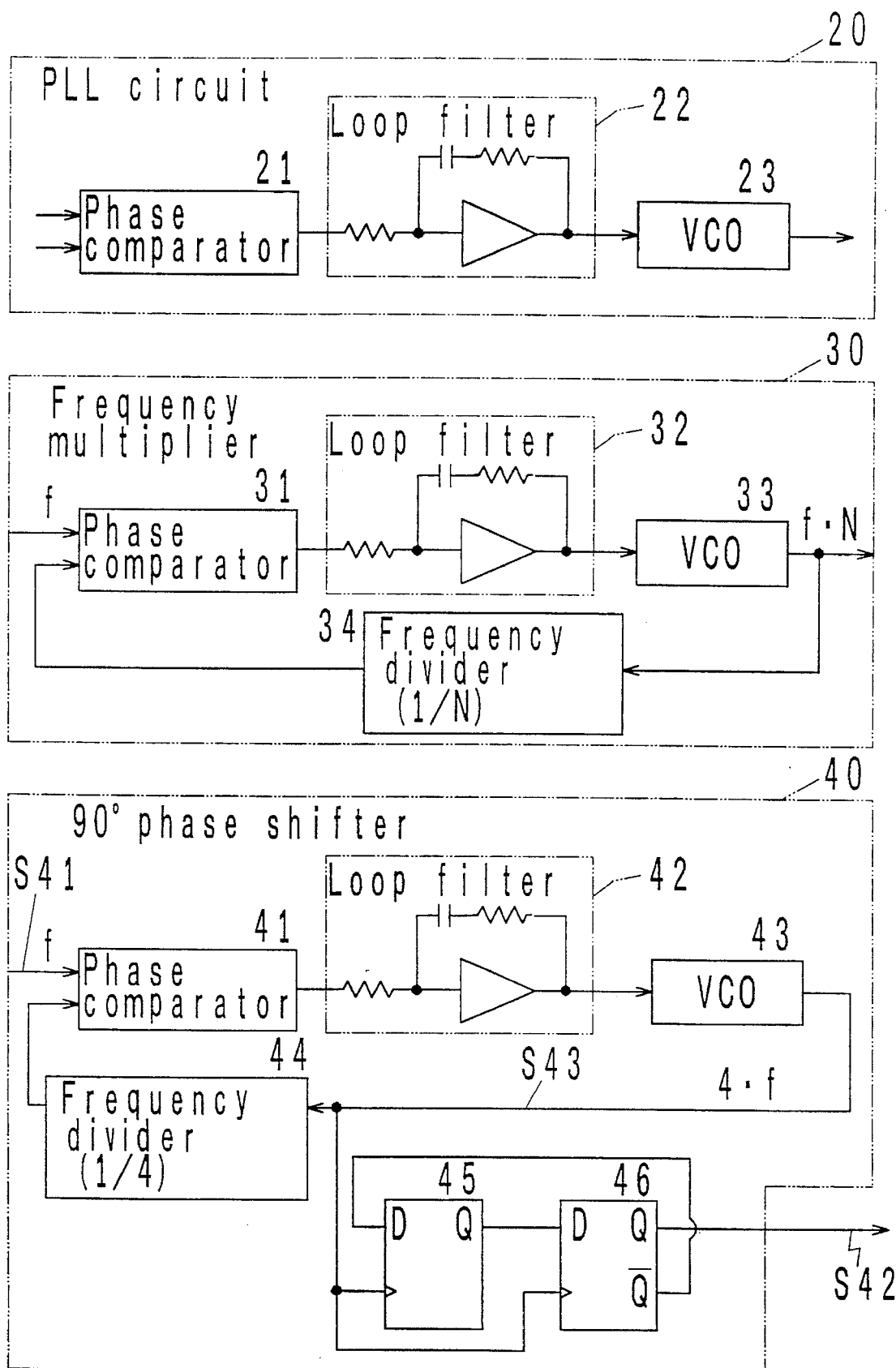
FIG. 2 is a block diagram of certain blocks used in the detector shown in FIG. 1.
Figure 3:
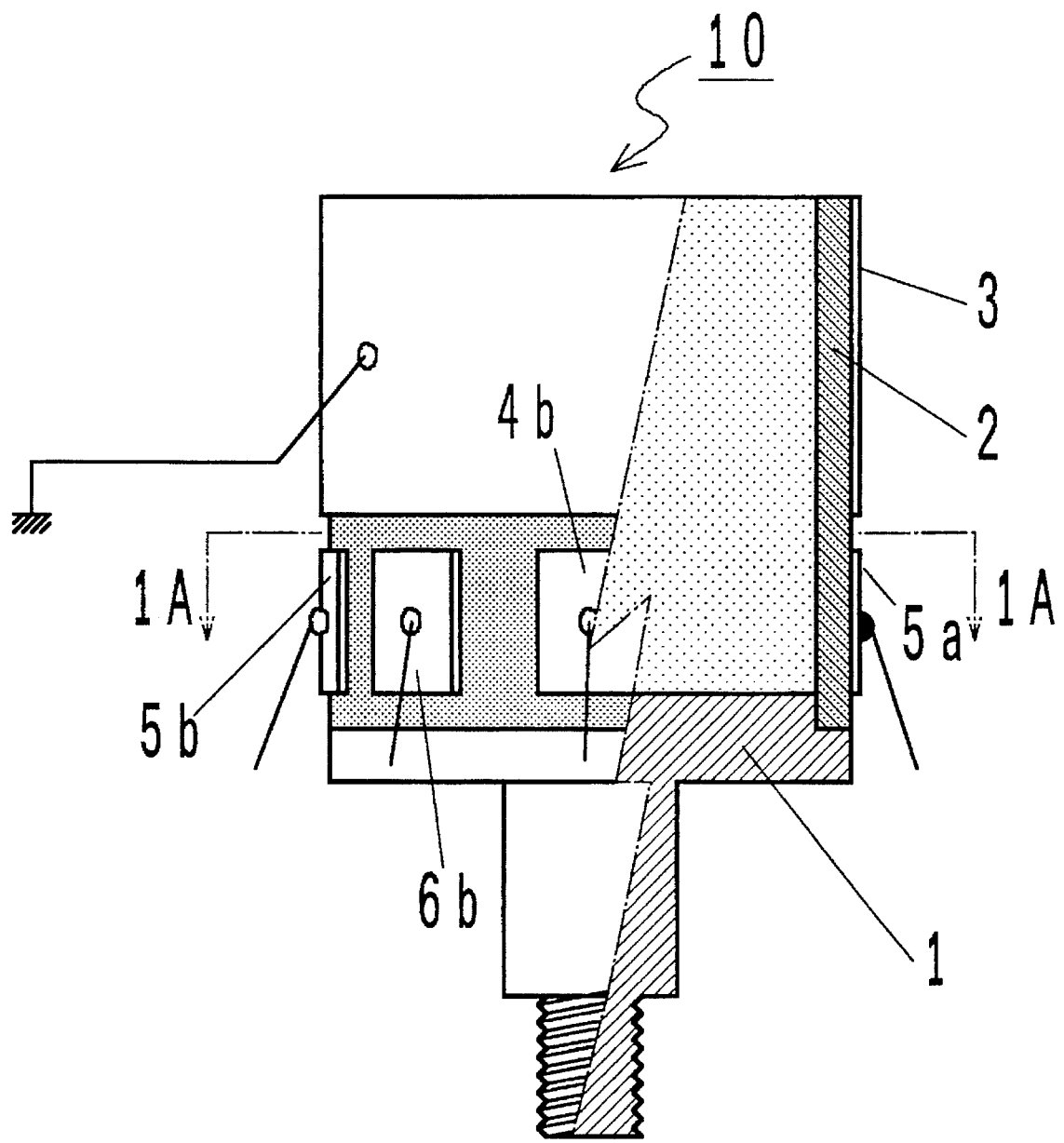
FIG. 3 is a front view, partly in section, illustrating the appearance of a sensor element 10.

Referring to FIG. 2, the PPL circuit 20 comprises a phase comparator 21, a loop filter 22 and VCO (voltage controlled oscillator) 23. The phase comparator 21 includes a pair of input terminals, and delivers a pulse signal having a pulse width which depends on a phase difference between pulse signals applied to its input terminals. The loop filter 22 delivers a signal having an analog voltage which depends on the pulse width of the signal which is output from the phase comparator 21. This signal is fed to VCO 23, which then delivers a sinusoidal wave signal having a frequency which depends on its input voltage. The PLL circuit 20 operates in a manner such that the frequency of the sinusoidal wave signal which is delivered therefrom is automatically adjusted so that the phase difference between the pulse signals applied to the pair of input terminals thereof becomes equal to zero.

Also referring to FIG. 2, the 90° phase shifter 40 comprises a phase comparator 41, a loop filter 42, VCO 43, a frequency divider 44 and a pair of flipflops 45, 46. The phase comparator 41, the loop filter 42, VCO 43 and the frequency divider 44 constitute together a frequency multiplier circuit. In the similar manner as occurred in the PLL circuit 20, the phase comparator 41 operates to deliver a pulse signal having a pulse width which depends on a phase difference between the pulse signals applied to its pair of input terminals. The loop filter 42 delivers a signal of an analog voltage which corresponds to the pulse width of the signal which is output from the phase comparator 41, and this signal is fed to VCO 43, which then operates to deliver a sinusoidal wave signal having a frequency which depends on the input voltage. The output signal from VCO 43 is frequency demultiplied by 1/4 by the frequency divider 44 and is fed back to one of the input terminals of the phase comparator 41. Accordingly, in this frequency multiplier circuit, the phase difference between the pulse signals applied to the pair of input terminals of the phase comparator 41 will be equal to zero when VCO 43 delivers a signal having a frequency which is four times the frequency f of the signal which is input to the 90° phase shifter 41, whereupon the phase shifter is locked. In this manner, the output signal from VCO 43 has a frequency which is equal to 4 f.

The output signal from VCO 43 is applied to the flipflops 45 and 40 as a clock pulse. There is obtained a signal S42 at the output terminal (Q) of the flipflop 46 which is phase lagging with respect to the output signal S42 from VCO 43 by one period thereof and which has a period that is four times the period of the signal S41. In other words, the output signal S42 from the 90° phase shifter 40 has the same frequency as the input signal S41, and is phase lagging with respect thereto by 90°. The amount of phase shift which occurs in the 90° phase shifter 40 is maintained at 90°, regardless of any fluctuation in the frequency of the input signal S41, inasmuch as the phase shift corresponds to one period, as considered in terms of four times the frequency of the input signal S41.

Returning to FIG. 1, the signal occurring at the feedback electrodes 4a, 4b has a phase difference of 90° with respect to the signal applied to the exciting electrodes 5a, 5b when the cylindrical piezoelectric body 2 is oscillating at its resonance frequency, but such phase difference changes in response to a deviation of the signal frequency from the resonance frequency. It will be seen that the signal SE which is formed from the signal applied to the exciting electrodes 5a, 5b by lagging it by 90° in the phase shifter 40 is applied to one of the input terminals of the PLL circuit 20, while the signal SF which is generated from the signal occurring at the feedback electrodes 4a, 4b is applied to the other input terminal of the PLL circuit 20. Accordingly, when the cylindrical piezoelectric body 2 is oscillating at its resonance frequency, the PLL circuit 20 is locked and maintains a constant oscillation frequency. However, when the oscillation frequency deviates from the resonance frequency as caused by a temperature change, there is a phase displacement between the two input signals to the PLL circuit 20, and the PLL circuit 20 adjusts the oscillation frequency so as to eliminate such phase displacement. In this manner, the cylindrical piezoelectric body 2 is always driven for oscillation at its resonance frequency.

It will be noted that each of the low pass filters 12, 13 and 14 represents a time constant circuit, producing a phase difference between its input and output, which changes in accordance with a signal frequency. However, it will be seen that a phase displacement caused by the low pass filter 14 has influences upon the signals SE and SF in common. Since the influence of the phase displacement caused by the low pass filter 12 upon signal SF substantially matches the influence of the phase displacement signal caused by the low pass filter 13 upon signal SE, these influences are cancelled by each other as far as the PLL circuit 20 is concerned. Hence, any phase displacement caused by the low pass filters 12, 13 and 14 has no substantial influence upon the PLL circuit 20, and accordingly, the cylindrical piezoelectric body 2 is maintained at its resonance in the presence of any fluctuation in the oscillation frequency.

A circuit for determining an angular rate of rotation will now be described. A signal occurring at the detecting electrodes 6a, 6b on the piezoelectric body 2 is passed through a low pass filter 11 to be applied to an inverter 15 with a Schmidt trigger, whereby it is converted into a binary signal SG. The signal SG is applied to one of input terminals of an exclusive OR gate 51, the other input terminal of which receives the signal SF which is formed from the signal occurring at the feedback electrodes 4a, 4b. An output signal SH from the gate 51 is applied to one of input terminals of NAND gate 52, the other input terminal of which receives an output signal SI from a frequency multiplier circuit 30. The frequency multiplier circuit 30 has an input which is fed from a frequency divider 56, an input terminal of which receives the output signal SN from the PLL circuit 20. The signal SN is also applied to a counter 55 as a clock pulse. The counter 55 delivers a carry signal SJ which is applied to a clear terminal of a counter 53 and to a clock terminal of a latch 54. An output signal SK from the gate 52 is applied as a clock pulse (a signal to be counted) to the counter 53, a count SL of which is applied to the input terminal of the latch 54.

In the present embodiment, the frequency demultiplier 18 delivers a signal having a period which is 32 times that of an input signal thereto. On the other hand, the frequency divider 56 delivers a signal having a period which is 31 times that of an input signal thereto. The frequency multiplier circuit 30 delivers a signal having a frequency which is 1024 times that of an input signal thereto. The counter 55 has a radix of 992. Accordingly, denoting the period and frequency of the signal SA as T and f, various signals have periods and frequencies as indicated below:

| SA, SB, SC: | T | f |
|---|---|---|
| SN: | T/32 | 32f |
| SJ: | 31T | f/31 |
| SI: | 31T/(32 × 1024) | (32 × 1024) f/31 |

Figure 5:
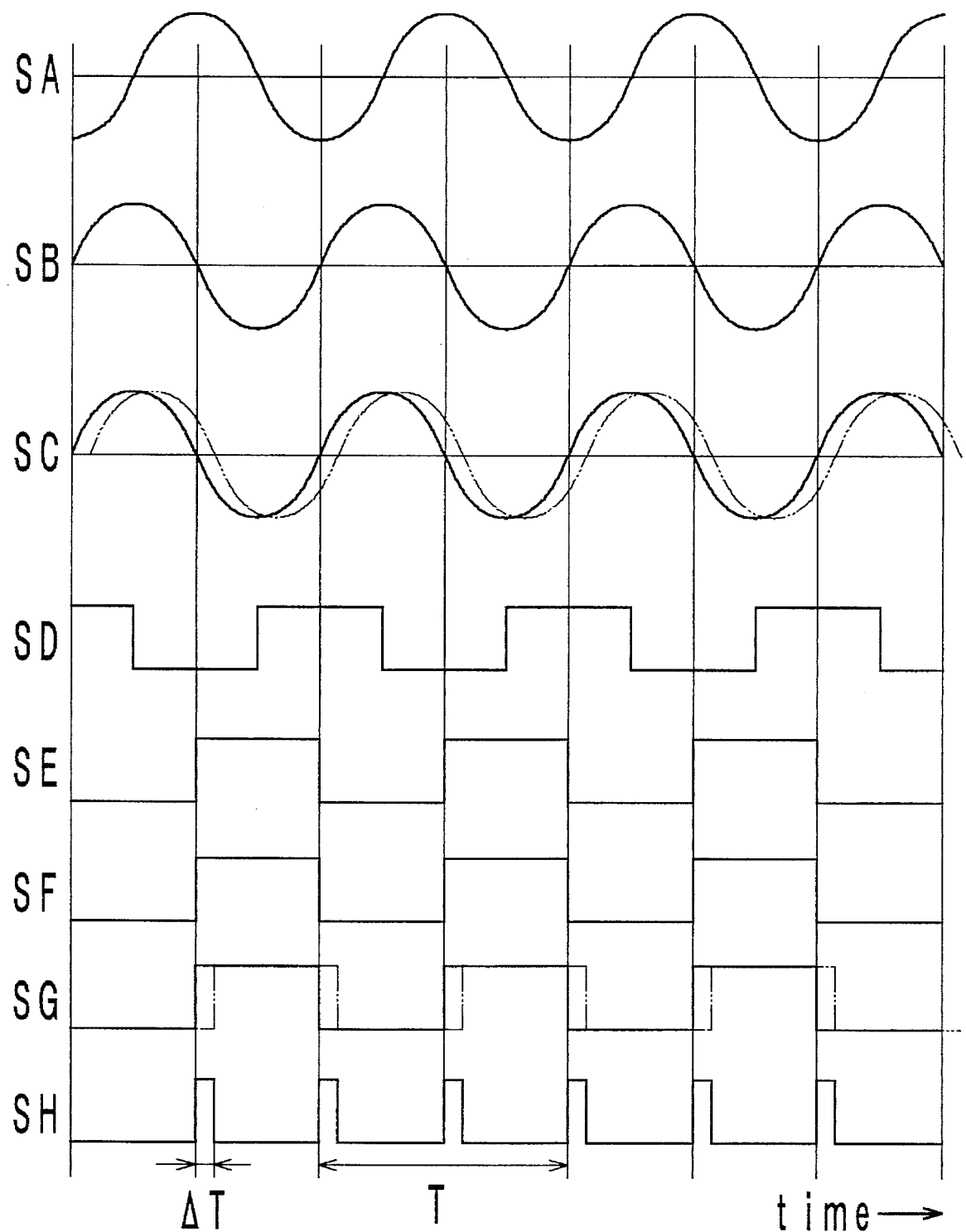
FIG. 5 is a series of timing charts showing exemplary signals appearing at various parts of the circuit shown in FIG. 1.

Examples which illustrate the timing of the signals SA, SB, SC, SD, SE, SF, SG and SH are shown in FIG. 5. A phase difference between the signals SA and SB is maintained at 90° by a control through the PLL circuit 20. A phase difference between the signal SB (SF) and the signal SC (SG) varies in proportion to an angular rate of rotation which the cylindrical piezoelectric body 2 is subject to. Denoting the pulse width of the signal SH which is delivered by the gate 51 by ΔT, it follows that ΔT/T varies in proportion to a phase difference between the signals SF and SG or the angular rate. Accordingly, by measuring ΔT/T, information indicative of the angular rate is obtained.

Referring to FIG. 2, the frequency multiplier circuit 30 comprises a phase comparator 31, loop filter 32, VCO 33 and frequency divider 34. The frequency demultiplier 34 has a demultiplying factor of 1024. Accordingly, a signal having a frequency which is 1024 times the input signal is obtained at the output of the frequency multiplier circuit 30.

Figure 6:
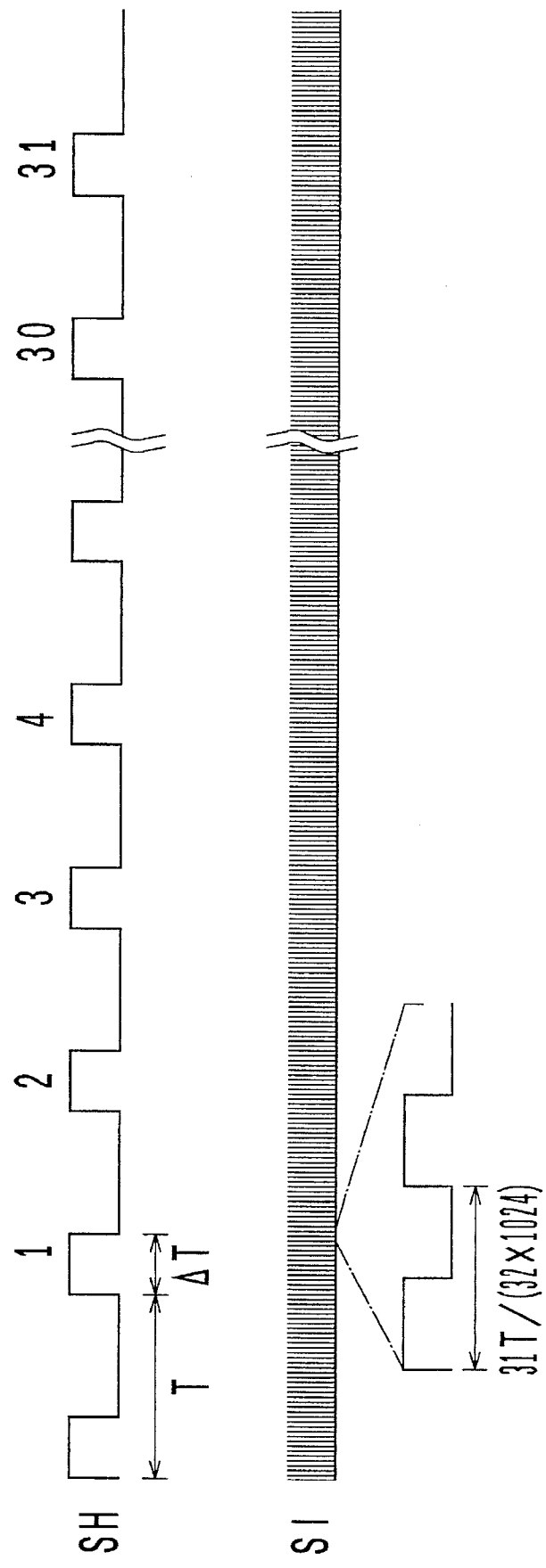
FIG. 6 is another series of timing charts illustrating other signals appearing at different parts of the circuit shown in FIG. 1.
Figure 6:
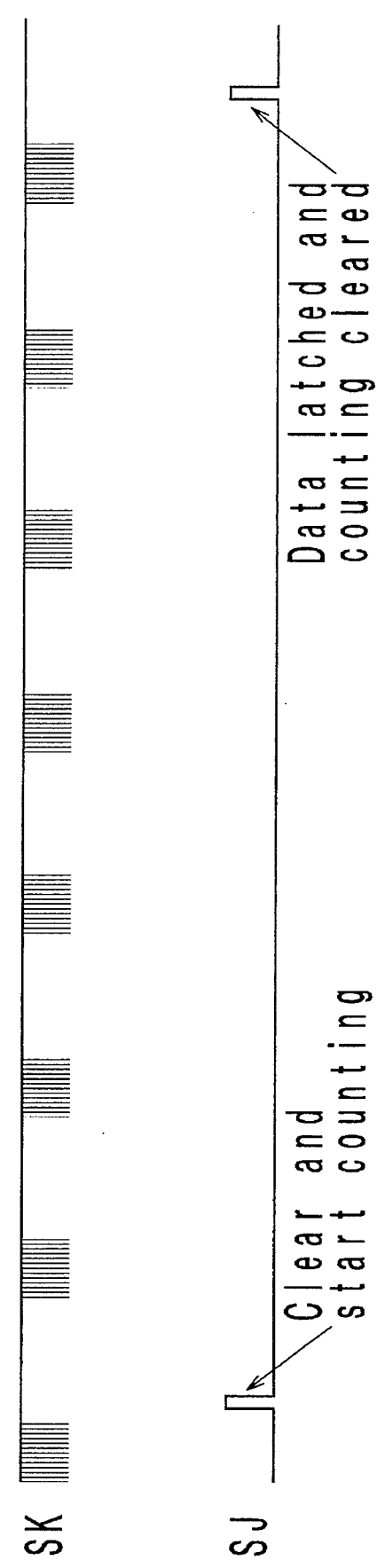

Referring to FIG. 6, it will be seen that the signal SH assumes its high level H for an interval ΔT for each period T. A pulse indicated by the signal SI appears in the signal SK during the internal the signal SH assumes its high level. The number of pulses as represented by the signal SK, or occurring in a time interval corresponding to ΔT which corresponds to the angular rate, is counted by the counter 53. Since the signal SJ which clears the counter 53 has a period equal to 31T, the counter 53 accumulates a time count equal to ΔT×31, which is retained in the latch 54 and is delivered therefrom as the signal SM.

It is to be noted that in the circuit shown in FIG. 1, the frequency dividers 18 and 56 have different dividing factors for a special reason. Thus, by causing the frequency of the signal SI representing pulses to be counted by the counter 53 to be offset from an integral multiple of the oscillation frequency (1/T) of the piezoelectric body 2, the accuracy of measurement can be enhanced without unduly increasing the frequency of the signal SI.

Assuming that the demultiplying factor of the frequency demultiplier 56 is changed to 1/32 in the circuit shown in FIG. 1, the signal SI then has a frequency of 1024 f, and accordingly the resolution when determining a phase difference (ΔT/T) will be equal to 1/1024, and this precludes a minute change in the angular rate from being determined. If the frequency of the signal SI is increased in order to improve the resolution, the counter 53 must be constructed using a high speed circuit, resulting in a very expensive arrangement.

In the actual circuit shown in FIG. 1, the signal SI has a frequency of (32×1024) f/31, and accordingly, the number of pulses in the signal SI which occurs during a time interval T will be equal to 32×1024/31. In a digital circuit, a fraction in the number of pulses which is located below the decimal point will be either rounded off or rounded up, causing an error. However, when the frequency dividers 18 and 56 have different dividing factors, the phase at which a pulse in the signal SI occurs during the time interval T will be slightly displaced from time to time, whereby during a certain time period, a fraction or a portion below the decimal point in the number of pulses in the signal SI which are counted during the time interval T will be rounded off while during a different time period, a similar fraction in the number of pulses in the signal SI which are counted during the time interval T will be rounded up. In this manner, an error is reduced by averaging the numbers of pulses which are obtained over a plurality of time periods.

In actuality, the signal SJ which determines the period for the counting operation of the counter 53 has a period of 31T, and thus a time measurement for ΔT is repeated 31 times, and an accumulated value of ΔT over the time interval 31T, or a value in which errors caused by rounding off and up are smoothed out, is counted by the counter 53 and is retained in the latch 54. Since the number of pulses in the signal SI which occurs during the time interval 31T is equal to 32×1024, the resolution in determining the phase difference (ΔT/T) will be 1/(32×1024). In this manner, the resolution will be improved by a factor of 32 as compared with an arrangement in which the both frequency dividers 18 and 56 have an equal dividing factor. This allows the angular rate to be determined with a high accuracy even if the signal SJ has a low frequency.

By way of example, when the cylindrical piezoelectric body 2 has an oscillation frequency of 8 kHz, it will be necessary to count clock pulses having a frequency of 144 MHz in order to detect a phase difference with a resolution of 0.02° using a usual circuit, and this makes a circuit arrangement very difficult. However, according to the embodiment, the frequency of the clock pulse (SI) can be reduced to about 4.8 MHz, thus greatly facilitating the circuit arrangement.

Figure 7:
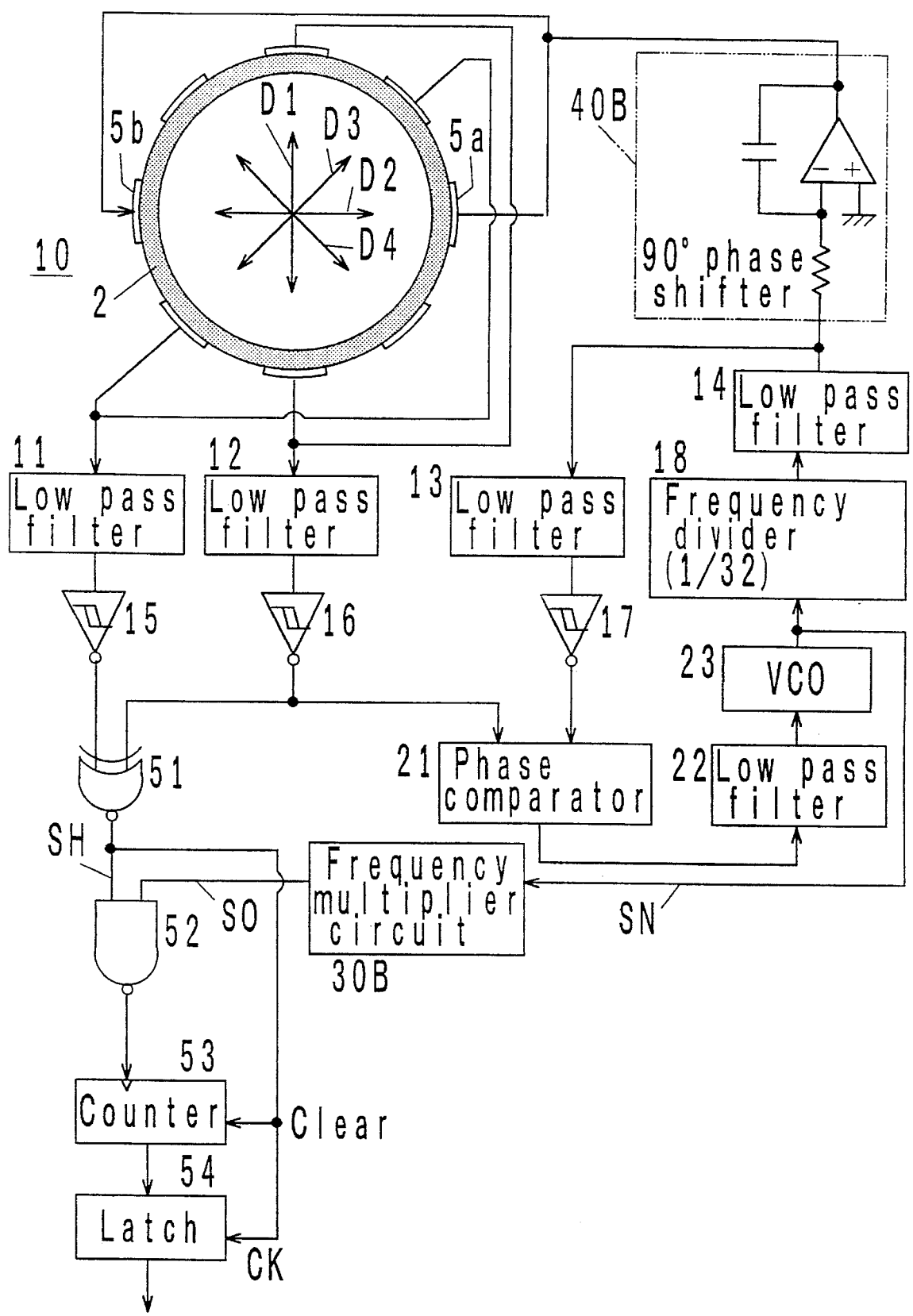
FIG. 7 is a block diagram of an angular rate detector according to a modification.

FIG. 7 shows an angular rate detector according to a modification. Corresponding parts are designated by like numerals and characters as used before. In this embodiment, a signal SN which is output from VCO 23 in a PLL circuit is multiplied by a frequency multiplier circuit 30B to produce a clock pulse SO, which is fed through NAND gate 52 to be counted by a counter 53. Accordingly, the frequency of the clock pulse SO is an integral multiple of the oscillation frequency of the piezoelectric body 2. The signal SH acts to control a latching operation of a latch 54 and a clearing operation of the counter 53 at its falling edge. Accordingly, in this embodiment, a counting of clock pulses SO and the clearing operation take place for each period of the signal SH. It is necessary to increase the frequency of the clock pulse SO in order to achieve the similar resolution as obtained in the previous embodiment.

In the embodiment shown in FIG. 7, a 90° phase shifter 40B is interposed between the output of a low pass filter 14 and the exciting electrodes 5a, 5b, and an output signal from an inverter 17 is directly input to a phase comparator 21. Additionally, the 90° phase shifter 40B in this embodiment is constructed as an integrating circuit employing an operational amplifier. Since a signal which is input to the phase shifter 40B is a sinusoidal wave, an integration thereof results in a signal (cosine waveform) which is phase displaced by 90° with respect to the input. The amount of phase shift which occurs in the 90° phase shifter 40B is independent from any fluctuation in the signal frequency.

In each embodiment described above, the PLL circuit 20 controls such that a phase difference between the signals occurring at the exciting electrodes 5a, 5b and the feedback electrodes 4a, 4b is maintained at 90° in order to enable the cylindrical piezoelectric body 2 to be excited always at its resonance, but it is unnecessary that such phase difference be limited to 90°. Any other phase difference may be chosen which allows the resonance. In addition, as a matter of practice, variations which are found in the circuit parameters and the response of the oscillator, the oscillator may assume its maximum resonance when the phase difference is slightly offset from a theoretical value of 90°. Accordingly, assuming that the theoretical value of the phase difference is 90°, it is possible to control an actual phase difference in a range from 80° to 100°. In addition, the oscillation frequency of the oscillator need not be perfectly in coincidence with the resonance frequency. While the coincidence between the oscillation frequency and the resonance frequency is most preferred, the occurrence of noises can be suppressed to a degree as far as the oscillation frequency is located adjacent to the resonance frequency, thus presenting no problem whatsoever for practical purposes.

Figure 8:
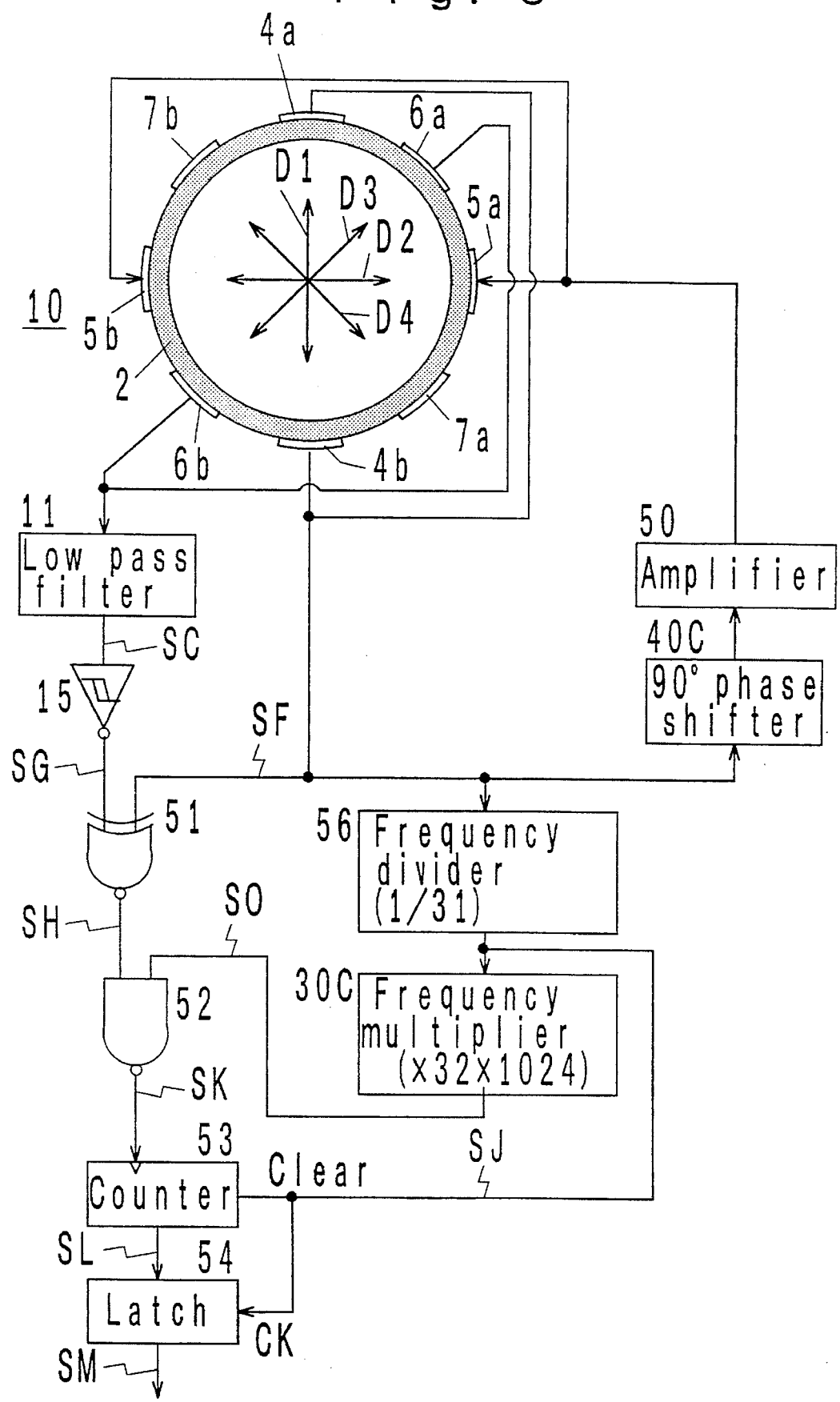
FIG. 8 is a block diagram of an angular rate detector according to a further modification.

FIG. 8 shows an angular rate detector according to a further modification, and again corresponding parts are designated by like numerals and characters as used before. In this embodiment, the cylindrical piezoelectric body 2 is driven by a self-excited oscillation circuit which includes the piezoelectric body 2 itself. Specifically, a signal which is delivered from feedback electrodes 4a, 4b on the piezoelectric body 2 is phase shifted through 90° in a 90° phase shifter 40C, and then amplified in an amplifier 50 to be applied to exciting electrodes 5a, 5b. When the piezoelectric body 2 is in oscillation, a signal which is phase displaced by 90° with respect to the signal applied to the exciting electrodes 5a, 5b occurs at the feedback electrodes 4a, 4b, and this signal can be phase shifted through 90° in the 90° phase shifter 40C, thus obtaining a signal having the same phase as the signal initially applied to the exciting electrodes 5a, 5b. Such signal is amplified in the amplifier 50 and again applied to the exciting electrodes 5a, 5b, whereby a positive feedback occurs in a closed loop including the exciting electrodes 5a, 5b, the piezoelectric body 2, the feedback electrodes 4a, 4b, 90° phase shifter 40C, amplifier 50 and returning to the exciting electrodes 5a, 5b. The amplifier 50 is effective to provide a loop gain which exceeds 1, causing an oscillation in this loop. It is to be understood that the 90° phase shifter 40C is identical in construction to the 90° phase shifter 40B shown in FIG. 7.

Frequency divider 56 receives the signal occurring at the feedback electrodes 4a, 4b and derives a signal which is divided by 1/31. A frequency multiplier circuit 30C receives the output signal from the frequency divider 56 and produces a signal having a frequency which is multiplied by 32×1024. Accordingly, a product of the demultiplying factor (1/31) of the frequency divider 56 and the multiplying factor (32×1024) of the frequency multiplier circuit 30C is equal to (32×1024/31), which is intentionally offset from an integer. An output signal SO from the frequency multiplier circuit 30C is applied to one of inputs to AND gate 52 as a clock pulse. An output signal SJ from the frequency divider 56 is applied to a counter 53 and a latch 54 as a signal which determines a time interval for one counting operation.

The product of the dividing factor (1/31) of the frequency divider 56 and the multiplying factor (32×1024) off the frequency multiplier circuit 30C is offset from an integer for the same reason as mentioned above in connection with the embodiment shown in FIG. 1. Thus, by so doing, the accuracy of measurement can be improved without unduly increasing the frequency of the signal SO.

In the actual circuit shown in FIG. 8, since the frequency of the signal SO is equal to (32×1024) f/31, the number of pulses in the signal SO which occurs during the time interval T will be equal to 32×1024/31. It will be seen that a fraction or a portion below the decimal point in the number of pulses will be either rounded off or up normally in a digital circuit, causing an error. However, since the described product is offset from an integer, the phase at which a pulse in the signal SO occurs during the time interval T will be slightly displaced from time to time, so that during a certain time period, a fraction below the decimal point in the number of pulses in the signal SO which are counted during this time interval T may be rounded off, while in a different time period, a corresponding fraction may be rounded up. By averaging the number of pulses counted over a plurality of time periods, a resulting error can be reduced.

In actuality, the signal SJ which determines the time period for the counting operation of the counter 53 has a period equal to 31T, a time measurement for $\Delta T$ is repeated 31 times, and accumulated value of $\Delta T$ over the time interval 31T, or a value in which errors caused by rounding off and up are smoothed out, is counted by the counter 53 and is retained in the latch 54. Since the number of pulses in the signal SO which occurs during the time interval 31T is equal to 32×1024, the resolution achieved in measuring the phase difference ($\Delta T/T$) is equal to 1/(32×1024). Thus, the resolution is improved by a factor of 32 as compared in an arrangement in which the product of the dividing factor and the multiplying factor is equal to an integer. This allows the angular rate to be determined with a high accuracy even when the signal SO has a low frequency.

In the embodiment shown in FIG. 8, it is assumed that the phase difference between the signals occurring at the exciting electrodes 5a, 5b and the feedback electrodes 4a, 4b on the piezoelectric body 2 is equal to 90°, and the amount of phase shift which occurs in the phase shifter 40C is chosen to be equal to 90° in order to realize a positive feedback. Accordingly, if the amount of phase shift is different from 90° or an additional phase shift is caused by other circuit elements, it is necessary to change the amount of phase shift which occurs in the phase shifter 40C. At any rate, the requirement is that an arrangement must be made such that a positive feedback occurs in a closed loop including the exciting electrodes 5a, 5b, cylindrical piezoelectric body 2, feedback electrodes 4a, 4b, 90° phase shifter 40C, amplifier 50 and returning to the exciting electrodes 5a, 5b. It will be noted from comparison of FIG. 8 to FIG. 1 that the circuit arrangement is greatly simplified. Thus, in the arrangement of FIG. 8, there is no need to provide the PLL circuit in order to drive the cylindrical piezoelectric body 2, and there is no need to provide a special counter (55) in order to produce the signal SJ which controls the counter 53 and the latch 54, thus reducing the number of elements required and enabling a reduction in the manufacturing cost.

As discussed above, in accordance with the invention, the clock pulse which is counted is formed by frequency multiplying a signal which corresponds to the oscillation frequency of the oscillator, and accordingly, the period of the clock pulse has a proportional relationship with the period T of oscillation. As a consequence, any change in the period of oscillation T as may be caused by a temperature fluctuation does not result in a change in the number of pulses which are counted by counter means. In other words, a count which the counter means obtains has an established proportional relationship with respect to $\Delta T/T$ or the angular rate of rotation, thus avoiding any error as may be caused by a variation in the period of oscillation of the oscillator. In addition, the need for a circuit which determines the period of oscillation of the oscillator or a circuit which calculates a ratio of such period of oscillation to the pulse width is eliminated, allowing a simplification of the circuit arrangement.

In a modification, the frequency multiplier means comprises a first frequency divider (18) disposed in a loop which controls the frequency of the oscillation means, a second frequency divider (56) having a different demultiplying factor from that of the first frequency divider for dividing the signal appearing at the input to the first frequency demultiplier, and a frequency divider circuit (30) for frequency multiplying an output signal from the second frequency divider. In this manner, the frequency of the clock pulse which is obtained at the output of the frequency multiplier circuit can be made offset from an integral multiple of the oscillation frequency of the oscillator.

By causing the frequency of the clock pulse obtained at the output of the frequency multiplier circuit to be offset from an integral multiple of the oscillaltion frequency of the oscillator, a fraction (a portion below the decimal point) is produced in the number of pulses which are counted by the counter means during a time interval when the phase difference pulse signal assumes either a high level or a low level. The phase of the clock pulse will be displaced for each time period of the phase difference pulse signal. Since a counting operation by the counter means accumulates the clock pulses which are counted over a plurality of time periods during which the phase difference pulse signal assumes a high or a low level, the fraction in the number of pulses will be rounded off during a certain time interval and will be rounded up in a different time interval, whereby errors caused by rounding off and up will be smoothed out. In this manner, a counting error is reduced to improve the resolution in detecting the angular rate even when the clock pulse has a relatively low frequency. This allows the counter or the like to be constructed in an inexpensive manner.

As a further modification, the frequency multiplier means may comprise a frequency divider (56) and a frequency multiplier circuit (30C) connected in series to each other, with the dividing factor of the frequency divider and the multiplying factor of the frequency multiplier circuit being chosen so that their product is offset from an integer. In this manner, the frequency of the clock pulse obtained at the output of the frequency multiplier circuit can be made offset from an integral multiple of the oscillation frequency of the oscillator, again allowing the resolution in detecting the angular rate to be improved in the same manner as mentioned in the previous paragraph.

What is claimed is:

1. An angular rate detector comprising:

an oscillator including a first terminal to which a drive voltage is applied, a second terminal where a signal occurs having a given phase displacement with respect to a signal appearing at the first terminal during a resonance of the oscillator, and a third terminal where a signal occurs having a phase which changes in accordance with an angular rate;

means for applying an alternating signal which corresponds to the drive voltage applied to the first terminal in accordance with the signal at the second terminal;

frequency multiplier means responsive to a signal which corresponds to the oscillation frequency of the oscillator to produce a clock pulse having a frequency higher than the oscillation frequency;

means for producing a phase difference pulse signal having a duty cycle which changes in accordance with a phase difference between the signal occurring at the third terminal of the oscillator and either the signal applied to the first terminal or the signal occurring at the second terminal;

and counter means for counting the clock pulse during a time interval when the phase difference pulse signal assumes a high or a low level.

2. An angular rate detector according to claim 1 in which the frequency multiplier means includes a first frequency divider disposed in a loop which controls the frequency of the oscillation means, a second frequency divider having a dividing factor which is different from that of the first frequency divider for dividing the signal appearing at the input to the first frequency divider, and a frequency multiplier circuit for frequency multiplying the signal which is output from the second frequency divider, further including means for producing a signal which establishes a time interval for the counting operation of the counter means which is equal to or greater than a plurality of periods of the oscillation of the oscillator.

3. An angular rate detector according to claim 1 in which the frequency multiplier means includes a frequency divider and a frequency multiplier circuit connected in series to each other, with a product of the dividing factor and the multiplying factor being chosen to be offset from an integer, an output signal from the frequency divider establishing a time interval during which a counting operation by the counter means occurs to be equal to or greater than a plurality of periods of oscillation of the oscillator.

4. An angular rate detector according to claim 1 in which the oscillator includes a substantially cylindrical piezoelectric body.

5. An angular rate detector according to claim 1 in which the oscillator includes a substantially cylindrical piezoelectric body, and the first, the second and the third terminal are mounted on the outer peripheral surface of the piezoelectric body.

6. An angular rate detector according to claim 1 in which the means for applying the alternating signal includes means for producing the alternating signal which corresponds to the oscillation frequency of the oscillator and applying it to the first terminal.

7. An angular rate detector according to claim 1 in which the means for applying the alternating signal includes means for forming a positive feedback loop, including the oscillator, connected between the first and second terminals of the oscillator.

* * * * *